(12) United States Patent
Song et al.

(10) Patent No.: US 8,140,869 B2
(45) Date of Patent: Mar. 20, 2012

(54) CENTRAL POWER MANAGEMENT

(75) Inventors: Song Song, Beijing (CN); Chang Jie Guo, Beijing (CN); Xiao Feng Wang, Beijing (CN); James Tien-Cheng Yeh, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 468 days.

(21) Appl. No.: 12/365,982

(22) Filed: Feb. 5, 2009

(65) Prior Publication Data

US 2009/0210726 A1 Aug. 20, 2009

(30) Foreign Application Priority Data

Feb. 18, 2008 (CN) .......................... 2008 1 0080418

(51) Int. Cl.
*G06F 1/00* (2006.01)
*G06F 1/32* (2006.01)
(52) U.S. Cl. ..................... 713/300; 713/320; 713/322
(58) Field of Classification Search ................... 713/300
See application file for complete search history.

(56) References Cited

U.S. PATENT DOCUMENTS

| | | | | |
|---|---|---|---|---|
| 5,546,591 A | * | 8/1996 | Wurzburg et al. ............ | 713/322 |
| 5,560,022 A | * | 9/1996 | Dunstan et al. ............... | 713/300 |
| 5,692,204 A | * | 11/1997 | Rawson et al. ............... | 713/340 |
| 5,694,607 A | * | 12/1997 | Dunstan et al. ............... | 713/340 |
| 6,115,823 A | * | 9/2000 | Velasco et al. ............... | 713/322 |
| 6,704,877 B2 | * | 3/2004 | Cline et al. .................... | 713/320 |
| 7,793,120 B2 | * | 9/2010 | McGrane et al. ............. | 713/300 |

FOREIGN PATENT DOCUMENTS

| | | |
|---|---|---|
| CN | 1752896 A | 3/2006 |
| JP | 2000-267766 A | 9/2000 |

* cited by examiner

*Primary Examiner* — Suresh Suryawanshi
(74) *Attorney, Agent, or Firm* — Douglas Lashmit; Hoffman Warnick LLC

(57) ABSTRACT

The present invention provides a central power management method and system, a device side agent and a central power management controller. The central power management method includes: registering a plurality of devices, wherein at least power management capabilities associated with controllable statuses of power management of each of the plurality of devices are recorded; collecting running status data from each of the plurality of devices; analyzing the running status data to determine a current power management policy for each of the plurality of devices; and for each of the plurality of devices, controlling running status thereof according to the current power management policy determined for the device and the power management capabilities of the device.

17 Claims, 8 Drawing Sheets

CENTRAL POWER MANAGEMENT

TECHNICAL FIELD

The present invention relates to the control field, in particular to a central power management method and system, a device side agent and a central power management controller.

TECHNICAL BACKGROUND

Globe warming and energy shortage are the two environment problems we are facing today. For lightening these problems, in respect of electric power usage, what is wished is to save electric energy and further reduce heat discharge due to electric power consumption as far as possible.

However, in a modern enterprise environment, more and more IT devices come into use, and most of them are powered on all the time. Thus, just these IT devices will consume large amounts of electric energy.

Especially in the recent years, data center/application system (distributed computing environment) power usage is the first infrastructure issue the IT environment of an enterprise faces. Five years ago, the average power consumption per rack was 1 kW to 3 kW. With requirements for processor cycles, memory, and storage continuing to increase, the density of the devices packed into each rack increases accordingly. It is now common for a typical rack to consume 5 kW to 7 kW of electric power, with each rack of high-density blade servers consuming 24~30 kW of electric power. Due to the dramatic increase in power consumption, the cost on electric power consumption of data center/application system increases, which places a large burden on the data center/application system for delivering this much electric power and cooling IT devices by using electric power additionally. It is easy to see why power management for data center/application system is so important.

Some of these IT devices do have power management capabilities, such as the ACPI (Advanced Configuration and Power Interface) in most PCs.

In the ACPI standard, some kinds of power management status are defined for certain kinds of IT components or devices, such as CPU, disk, CD-ROM, etc. By using ACPI, the devices complying with the ACPI standard may support to switch among these power management statuses at the hardware or software level.

However, for a data center/application system, although some of IT devices therein have ACPI and the IT devices may be network connected, they have to be configured and managed separately in order to bring ACPI into play.

One issue is that ACPI standard mainly focuses on defining a complicated power management interface for low level devices or components. For a data center/application system, thousands of devices therein may belong to hundreds of different device types. For resources and components contained in different types of devices being not completely identical generally, the specific ACPI settings related to resources and components of the different types of devices are also different generally. Therefore, configurations and managements need to be performed separately for these different types of IT devices.

At present, there is no central and automatic power management mechanism to monitor and manage the power consuming in a data center/application system (distributed computing environment).

In theory, it is wished that, with the help of ACPI like interface, the application developers can develop applications which can intelligently manage the power consumption of data center/application system to achieve the target of saving energy while implementing their own specific functions during execution. However, in practice, this is impractical for a large data center/application system. For example, it is almost impossible for the application developer to fully understand the power management details of thousands of different types of devices in the data center/application system and set for the devices at the application development stage, suitable power management oriented actions that should be taken during application running.

Therefore, there is a need for such a power management approach which can centrally manage the power consumption of data center/application system and can provide a power management interface for application development so that the central power management design during application running can be put forward to the application development stage.

SUMMARY OF THE INVENTION

In order to solve these and other problems, the present invention provides a central power management method and system, a device side agent and a central power management controller, so as to determine suitable power management policies in real time for a plurality of devices by centrally registering power management capabilities of the plurality of devices and monitoring running statuses of the devices, and further control the running statuses of the devices by using the policies, thereby implementing the central power management of the devices to achieve the target of saving power.

According to one aspect of the present invention, there is provided a central power management method, a device side agent and a central power management controller, wherein the method comprises: registering a plurality of devices, wherein at least power management capabilities associated with controllable statuses of power management of each of the plurality of devices are recorded; collecting running status data from each of the plurality of devices; analyzing the running status data to determine a current power management policy for each of the plurality of devices; and for each of the plurality of devices, controlling running status thereof according to the current power management policy determined for the device and the power management capabilities of the device.

BRIEF DESCRIPTION OF THE DRAWINGS

It is believed that the features, advantages and purposes of the present invention will be better understood from the following description of the detailed implementation of the present invention read in conjunction with the accompanying drawings.

DETAILED DESCRIPTION OF THE INVENTION

In the present invention, devices in a data center/application system may be clients, servers, switchers, storage, monitors, air conditioners, illuminating lamps, etc., inside the data center/application system. These devices have basic information, power management capabilities associated with controllable statuses of power management as well as running status data and history status data associated with power.

The basic information of a device includes, for example, device ID, address, device description, etc. The so-called power management capabilities associated with controllable statuses of power management includes, for example, resources and components associated with power consumption inside the device and further controllable statuses of the resources and components. For different types of devices, the power management capabilities are different. For example, for a PC, depending on resources or components such as CPU, disk, memory, fan, etc. contained therein, the power management capabilities thereof may comprise on/off of power supply, controllable clock frequency of the CPU, controllable usage of the disk, controllable usage of the memory, on/off of the fan, etc. For an illuminating lamp, the power management capabilities thereof may comprise only on/off of power supply. The power management capabilities of each of the devices can be collected from the device by an ACPI/device driver which is able to communicate with the components in the device to obtain statuses of the components.

Depending on the type of the device and the resource and components contained therein, the running status data and history status data associated with power of the device comprise, but are not limited to, resource usage, load status, component temperature, CPU speed, etc., wherein the resource usage may further comprise CPU and memory utilization rate; statuses of disk I/O, monitor, CD-ROM, keyboard and mouse, network traffic etc.

Next, a detailed description of embodiments of the present invention will be given with reference to the drawings.

First, a central power management method according to a first embodiment of the present invention will be described.

Figure 1:
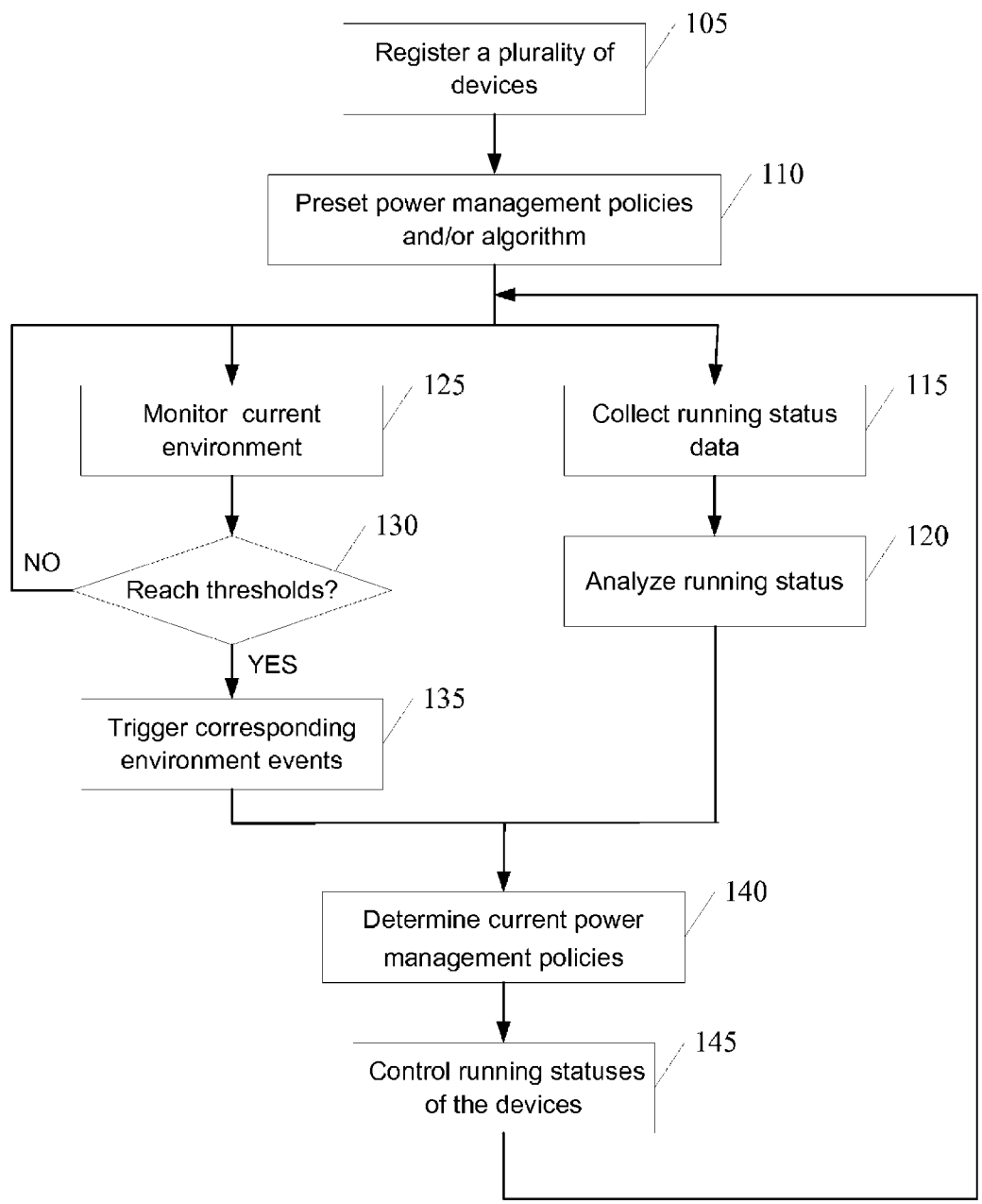
FIG. 1 is a flowchart of a central power management method according to a first embodiment of the present invention.

FIG. 1 is a flow chart of a central power management method according to a first embodiment of the present invention. As shown in FIG. 1, in order to perform central power management on the data center/application system, what should be made clear first is that which devices in the data center/application system need to be centrally power-managed. Thus at step 105, the devices in the data center/application system that need to be perform central power management are registered.

Specifically, in registration, for each of the devices, in addition to the basic information of the device, at least the power management capabilities associated with controllable statuses of power management of the device will be recorded. The registration of one or more of the devices may be implemented in multiple kinds of manner. That is, the registration may be implemented manually, may be initiated actively by the device side in response to predetermined policies or change of environment status, or may be implemented by using a certain kind of auto-discovery mechanism, and so on.

At step 110, based on the power management capabilities of each of the devices, a plurality of power management policies and/or a policy tuning algorithm are preset for each of the devices.

The power management policies and/or the policy tuning algorithm of each of the devices are used for setting running status of the device in order to implement management of power consumption status of the device.

Since power consumption of a device is the result of running statuses of a plurality of resources and components in the device, in order to manage the power consumption of the device, it is needed to manage the running statuses of these resources and components associated with the power consumption in the device. Therefore, at this step, for each of the devices, in order to enable the plurality of power management policies and/or the policy tuning algorithm preset for it to function to set the power consumption status of the device, each of the plurality of power management policies and/or the policy tuning algorithm is enabled to implement settings corresponding to a specific power consumption status, for the running statuses of the plurality of resources and components associated with power consumption in the device.

At this step, for each of the devices, the plurality of power management policies and/or the policy tuning algorithm are preset based on the registered power management capabilities of the devices.

For example, for a PC, each of the plurality of power management policies and/or the policy tuning algorithm preset for it should correspondingly comprises, for example, the settings for on/off of power supply of the PC, clock frequency of CPU, disk usage, memory usage, on/off of fan, etc., so that the PC can be in a specific power consumption status.

In addition, at this step, the presetting of the plurality of power management policies and/or the policy tuning algorithm for each of the devices may be implemented based on history data related to power. The specific process may be as follows: first, for each of the devices, by using an ACPI/device driver which can communicate with the components in the device, history status data associated with power are mined from the device; then the history status data are analyzed so as to summarize the best practice of power management policy design for each of the devices; and finally, a plurality of power management policies and/or a policy tuning algorithm are preset for each of the devices based on the above summarized best practice of power management policy design. Further, the above summarized best practice of power management policy design may be further used to optimize existing power management policies for one or more of the devices.

At step 115, running status data are collected from each of the devices. In order to implement a continuous and central power management for the devices, at this step, running status data are collected periodically from each of the devices by using the ACPI/device driver.

The period that running status data are collected from each of the devices may be set very frequent. For example, it may be set so that running status data are collected from each of the devices almost in real time, in order to perform central power management on the devices in real time. Specifically, the ACPI/device driver can be used to communicate with the components in each of the devices to obtain the statuses of the components which can indicate the running status of the device.

A specific example will be given below to illustrate this point.

In a large office environment owing hundreds of devices, there are some users who leave their seats without turning off their devices. In this case, each of the devices may be in the following one or more statuses:

The device's keyboard and mouse are not touched for a long time;

The monitor may be closed or enter the hibernation status;

The CPU or memory usage rate may become low;

. . .

For such a device, the ACPI/device driver is used to communicate with the components such as CPU, memory, disk I/O, monitor, CD-ROM, keyboard, mouse, etc., in the device, so as to collect running status data corresponding to the above statuses, which can indicate that the device is not in use. The collection of running status data may be implemented by each of the devices collecting and reporting actively its running status data according to predetermined policies or the change of environment status, may also be implemented by querying each of the devices for its running status data according to predetermined policies or the change of environment status, and so on.

In addition, at this step, the running status data collected from each of the devices may filtered to remove the data associated with unstable statuses therein, thus reducing the size of the data to be transferred.

At step 120, the above running status data are analyzed to determine the current running status of each of the devices, such as whether the device is busy or idle and the duration of the status.

At step 125, the current conditions of the environment where the devices are located, such as the current temperature and/or the current time, are monitored.

At step 130, it is determined that whether the current environment conditions, such as the current temperature and/or the current time has reached predefined thresholds, and if they have reached the predefined thresholds, corresponding environment events such as a temperature change event and/or a time change event are triggered at step 135. A plurality of thresholds may be set for each of the environment conditions such as temperature and/or time, and a corresponding environment event is set for each of the thresholds.

At step 140, a current power management policy is determined for each of the devices.

In one embodiment, at this step, for each of the devices, based on the result of analysis on its running status data at step 120 and/or the corresponding environment events such as the temperature change event and/or the time change event triggered at step 135, a power management policy suitable for the current running status of the device and/or the current environment conditions such as the current temperature and/or the current time is selected as the current power management policy of the device from the plurality of power management policies preset for the device at step 110.

In another embodiment, at this step, for each of the devices, based on the result of analysis on its running status data at step 120 and/or the corresponding environment events, such as the temperature change event and/or the time change event triggered at step 135, the device's original power management policy is tuned by using the policy tuning algorithm preset for the device at step 110, so as to accommodate to the current running status of the device and/or the current environment conditions, such as the current temperature and/or the current time.

A specific description will be given by way of examples.

When it is determined a certain device may be not in use currently according to the status that the mouse and keyboard of the device are not touched for a relatively long time at step 120, a power management policy which enables the components in the device to switch to a non-working status of low power consumption or no power consumption should be determined for the device at step 140.

When it is determined a certain device is again in use after being idle for a period of time according to the status that the mouse or keyboard of the device is touched again or a certain program (for example email checking or downloading application) starts after the device is not in use for a relatively long time at step 120, a power management policy that enables the components in the device to switch to a working status of high power consumption should be determined for the device at step 140.

At step 145, for each of the devices, the running status thereof is controlled according to the current power management policy determined at step 140 and its power management capabilities.

Specifically, at this step, for each of the devices, by using the ACPI/device driver which can communicate with the components in the device, according to the setting for the working statuses of corresponding components in the device in the current power management policy determined above and the power management capabilities of the device, the working statuses of these corresponding components are controlled, for example, making these corresponding components switch to another status.

The above is a detailed description of the central power management method of the embodiment. In the embodiment, by centrally registering the power management capabilities of the devices, monitoring the current running statuses of the devices and the current conditions of the environment where the devices locate, such as the current temperature and/or current time, determining suitable current power management policies for the devices in real time, and in turn controlling the current running statuses of the devices by using the policies, the central power management for these devices can be implemented so as to achieve the target of saving energy.

In addition, it should be noted that although the power management method of the present embodiment has been described with respect to the case of a plurality of devices in the above, it is not limited to this, and even for the case of only a device, the present embodiment also works.

In addition, in other embodiments, step 110 may also be not included, i.e., instead of presetting a plurality of power management policies and/or policy tuning methods for each of the devices, at step 140, for each of the devices, based on its current running status and/or the current environment conditions such as current temperature and/or current time, a suitable current power management policy is constructed directly.

A central power management method according to a second embodiment of the present invention will be described below.

Figure 2:
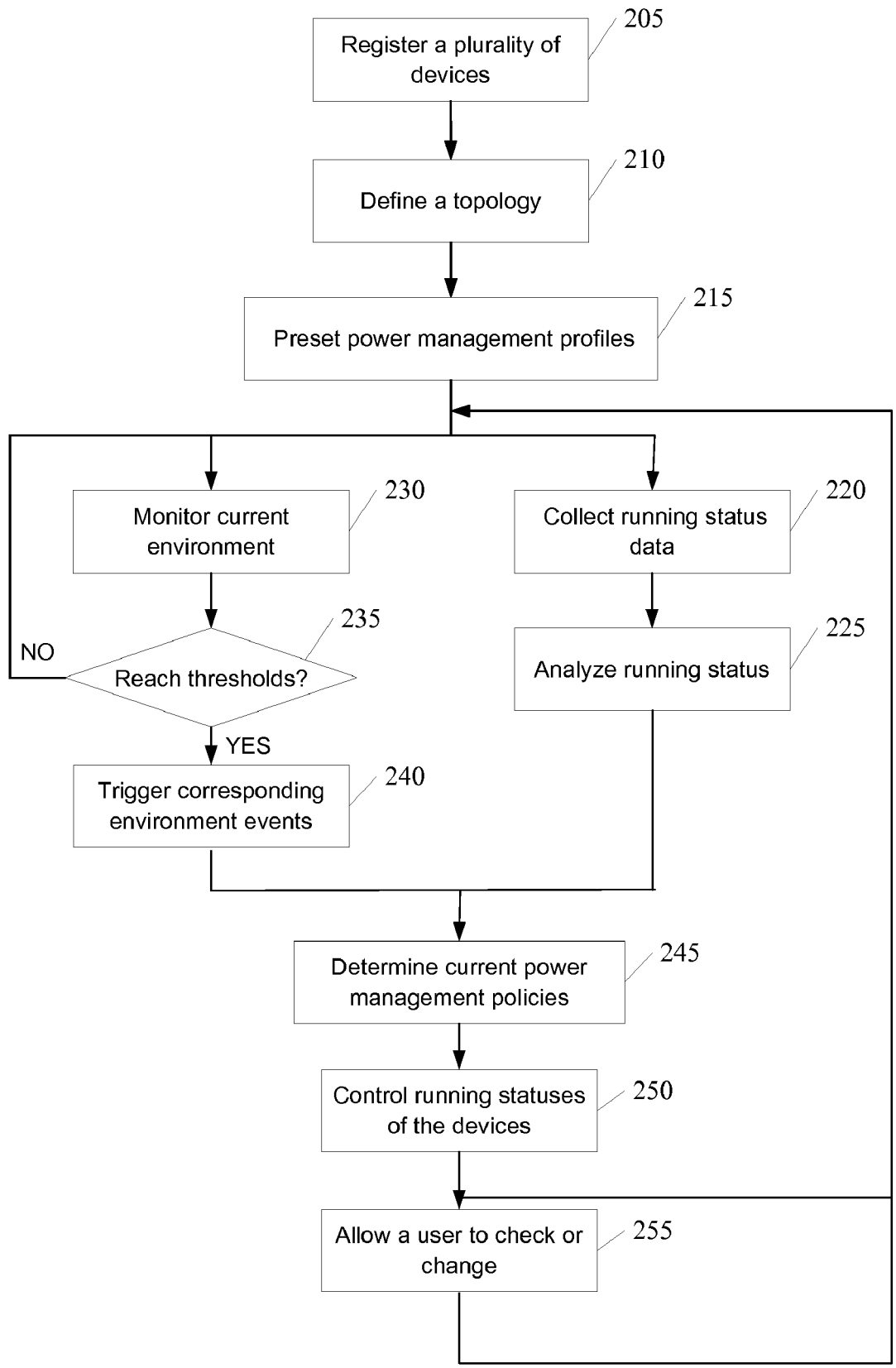
FIG. 2 is a flowchart of a central power management method according to a second embodiment of the present invention.

FIG. 2 is a flowchart of the central power management method according to a second embodiment of the present invention. As shown in FIG. 2, first at step 205, a plurality of devices in a data center/application system are registered.

Specifically, in registering, in addition to the basic information of the devices, at least the power management capabilities associated with controllable statuses of power management of each of the devices will be recorded.

At step 210, a topology is defined to manage the plurality of devices based on the power management capabilities of each of the plurality of devices.

Specifically, in the embodiment, the data center/application system is considered as a single virtual power managing unit, and the plurality of devices in the data center/application system are organized and managed via a multiple-levels hierarchy structure. Herein, the multiple-levels hierarchy structure is called a topology. In the present embodiment, the following four kinds of elements are defined for the topology:

Atomic component (the lowest level): the smallest and unbroken power managing unit, such as the CPU, CD-ROM, etc., for each of the plurality of devices, the atomic components thereof can be determined based on the power management capabilities registered for the device at step 205;

Device (intermediate level): a device is generally composed of one or more atomic components collaborating together to realize a certain function, such as the air condition, server, storage, monitor, network switch etc.;

Device group (intermediate level): it is a group constituted by clustering a plurality of devices according to specific grouping policies, a device group may contain both devices and smaller device groups; and Data center/application system (the highest level): it is the root of all devices and device groups.

In the present embodiment, depending on real scenario, based on the power management capabilities of each of the plurality of devices, from one or more different views of function, location, application, power consumption, manageability, influence on environment, influence on performance, and organization structure of a device, respectively, one or more topologies may be defined for the plurality of devices as the power management components/devices organization structure.

Figure 4:
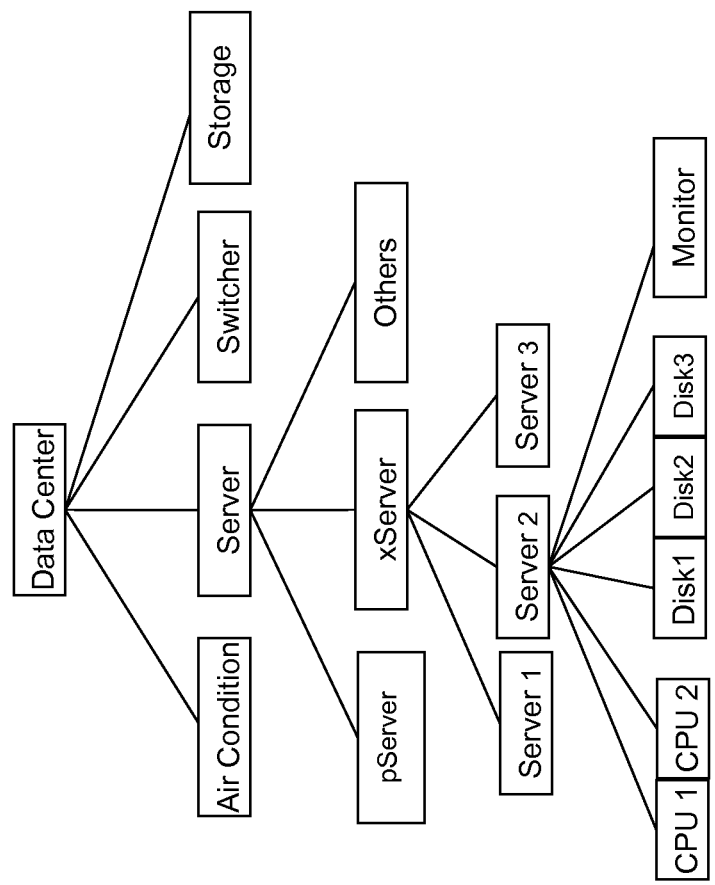
FIG. 4 is an example of a topology defined for a plurality of devices based on functions of the devices.
Figure 3:
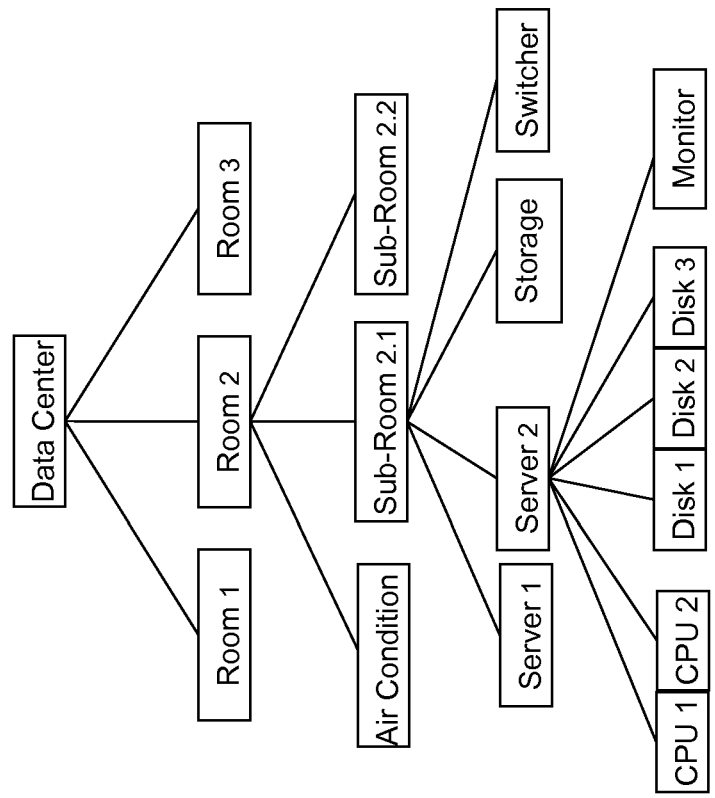
FIG. 3 is an example of a topology defined for a plurality of devices based on locations of the devices.
Figure 5:
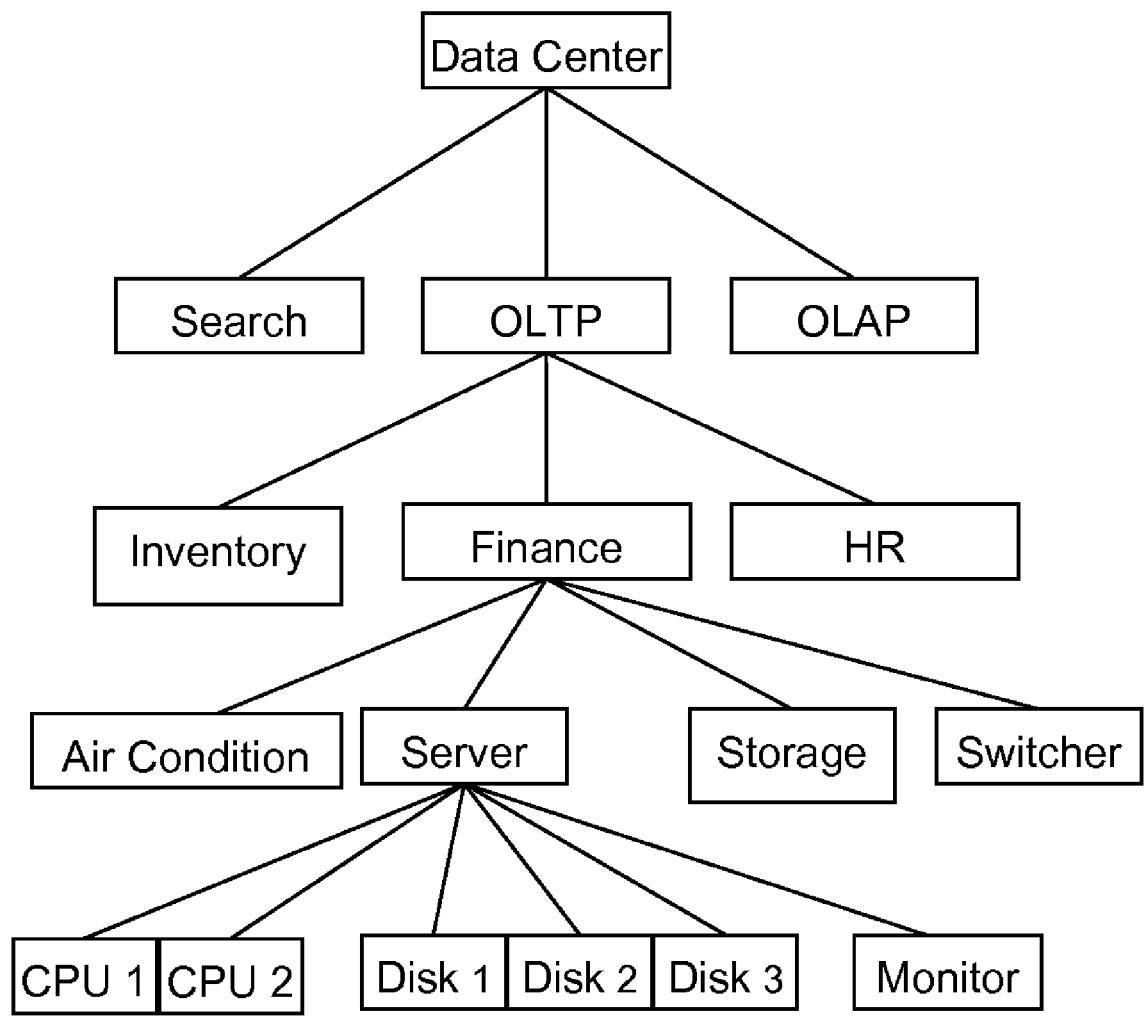
FIG. 5 is an example of a topology defined for a plurality of devices based on applications of the devices.

FIGS. 3-5 show some typical organization approaches of topologies. FIG. 3 shows an example of a topology defined for a plurality of devices in a data center based on the locations of the devices. FIG. 4 shows an example of a topology defined for a plurality of devices in the data center based on the functions of the devices. FIG. 5 shows an example of a topology defined for a plurality of devices in the data center based on the applications of the devices. These different topologies shown in FIGS. 3-5 represent different power management views with respect to the plurality of devices, respectively. In practical implementations, corresponding topologies may also be defined from any other desired power management views.

At step 215, with respect to the above topology, a plurality of power management profiles containing power management policies are generated for each element therein previously.

At this step, the previous generation of the plurality of power management profiles for each element in the topology may be implemented based on history data. The specific process may be as follows: first, for each of the plurality of devices, history status data are mined from the device by using the ACPI/device driver that is capable of communicating with the components in the device; then the history status data are analyzed so as to summarize the best experience of power management policy design for each element of the topology; and finally, based on the summarized best experience of power management policy design, a plurality of power management profiles containing power management policies are generated for each element in the topology in advance. The summarized best experience of power management policy design may further be used for optimizing existing power management profiles for one or more elements in the topology.

In addition, at this step, during the process of generating power management profiles, for each element at the lowest level in the topology, i.e., each atomic component, a plurality of power management profiles can be defined for the element based on the power management capabilities of each of the plurality of devices; for each element at intermediate level or the highest level in the topology, i.e., the device, device group, or data center/application system, based on the combination of power management profiles of lower level elements contained therein, a plurality of power management profiles can be generated.

Specific description will be provided by taking the topology shown in FIG. 3 as an example. For example, it can be seen from the topology of FIG. 3, the server 2 comprises a set of CPUs, disks, and a monitor. Thus, for the server 2, the power management profiles thereof may be constituted by respective power management profiles of these components it contains. For example, Table 1 below shows an example of such a power management profile of the server 2.

TABLE 1

| Power management profile of server 2: Server2Profile1 | | |
|---|---|---|
| CPU1 | CpuProfile1 | Normal working |
| CPU2 | CpuProfile2 | Reduce CPU Clock Frequency to xxx HZ |
| ... | | |
| Disk 1 | DiskProfile1 | Normal working |
| Disk 2 | DiskProfile1 | Normal working |
| Disk 3 | DiskProfile1 | Normal working |
| ... | | |
| monitor | MonitorProfile3 | Close |
| ... | | |

Likewise, for the device group sub-room 2.1 in the topology of FIG. 3, the power management profiles thereof may also be constituted by respective power management profiles of the components it contains. For example, Table 2 below shows an example of such a power management profile of the sub-room 2.1.

TABLE 2

| Power management profile of sub-room 2.1: SR2.1Profile1 | | |
|---|---|---|
| Sub-component | Sub-profile | Notes |
| Server 1 | Server1Profile2 | Server 1 suspends to RAM, with very low power consumption |
| Server 2 | Server2Profile1 | As defined in table 1 above |
| ... | | |
| Switcher | SwitcherProfile1 | Normal working |
| ... | | |
| Storage | StorageProfile1 | Normal working |
| ... | | |

At step 220, running status data are collected from each of the plurality of devices. Specifically, at this step, running status data are collected periodically from each of the plurality of devices by using the ACPI/device driver. The running status data collected from each of the plurality of devices may further be filtered to remove the data associated with unstable statuses therein.

At step 225, the above running status data are analyzed to determine the current running status of each of the plurality of devices, such as whether the device is busy or idle, and the duration of the status.

At step 230, the current conditions of the environment where the plurality of devices locate, such as the current temperature and/or the current time are monitored.

At step 235, it is determined that whether the current environment conditions, such as the current temperature and/or the current time have reached preset thresholds, and if they have reached the preset thresholds, corresponding environment events such as a temperature change event and/or a time change event are triggered at step 240.

At step 245, current power management profile is determined for each element in the topology.

In an embodiment, at this step, for each element in the topology, based on the result of analysis on the running status data of each of the plurality of devices at step 225 and/or the corresponding environment events such as the temperature change event and/or the time change event triggered at step 240, a power management profile suitable for the current running statuses of the components contained in the element (itself for the atomic component) and/or the current environment conditions such as the current temperature and/or the current time is selected as the current power management policy of the element from a plurality of power management profiles preset for the element at step 215.

In another embodiment, at this step, for each element in the topology, based on the result of analysis on the running status data of each of the plurality of devices at step 225 and/or the corresponding environment events, such as the temperature change event and/or the time change event triggered at step 240, the device's original power management profile is tuned to accommodate to the current running statuses of the components contained in the element (itself for the atomic component) and/or the current environment conditions such as the current temperature and/or the current time.

At step 250, according to the power management profile determined for each element in the topology at step 245, the running status of each of the plurality of devices is controlled.

Specifically, at this step, according to the power management profile of each element in the topology, for each of the plurality of devices, by using the ACPI/device driver that is capable of communicating with the components in the device, the working statuses of corresponding components in the device are controlled, for example making the corresponding components switch to another status.

At step 255, a user is allowed to check or change the power management profiles of the elements in the topology.

In the present embodiment, several APIs allowing the user to check or change the power management profiles of the elements in the topology are provided. An application developer can use such APIs to perform power management design at the same time when developing an application in the application development process. For example, the application developer can, based on the execution status of the application that will occur during its practical execution process, use a corresponding API to switch the current power management profiles of related elements in the topology to other power management profiles so as to save power consumption in the application execution process.

Table 3 below lists the detailed descriptions of several APIs provided in the present embodiment.

TABLE 3

| API | Description | Sample |
|---|---|---|
| CProfile CheckPMActiveProfile (PMTopology, ElementPath) | Check a certain element's active power management profile | CProfile MyProfile; MyProfile=CheckPMActiveProfile (locationTopology, "DataCenter.Room1.SubRoom2.1.Server2") |
| CProfileList CheckPMAllProfile (PMTopology, ElementPath) | Check a certain element's all pre-defined power management profiles | CProfileList MyProfileList; MyProfileList= CheckPMAllProfile (locationTopology, "DataCenter.Room1.SubRoom2.1.Server2") |
| BOOL SwitchPMActiveProfile (PMTopology, ElementPath, NewProfile) | Switch a certain element's active power management profile | BOOL IsSuccess; CprofileList MyProfileList; CProfile MyProfile; MyProfileList=CheckPMAllProfile (locationTopology, "DataCenter.Room1.SubRoom2.1.Server2") MyProfile=MyProfileList[2]; IsSuccess =SwitchPMActiveProfile (locationTopology, "DataCenter.Room1.SubRoom2.1.Server2", MyProfile) If (IsSuccess) { //Switch successively } else { //Fail to switch } |

The above is a detailed description of a central power management method according to the present embodiment. In the present embodiment, in addition to implementing central power management for a plurality of devices as the first embodiment, by managing these devices using a topology and power management profiles set for the topology as well as providing the APIs that can check or change the power management profiles, a user can check brief power management profiles in which the complex power management details of various devices are encapsulated, and an application developer can easily give consideration to power management design in the application development stage, thus developing an application that can give consideration to the power management of the deices while implementing a specific function in the execution process.

Under the same inventive concept, the present invention provides a central power management system, which will be described below in conjunction with the drawings.

Figure 6:
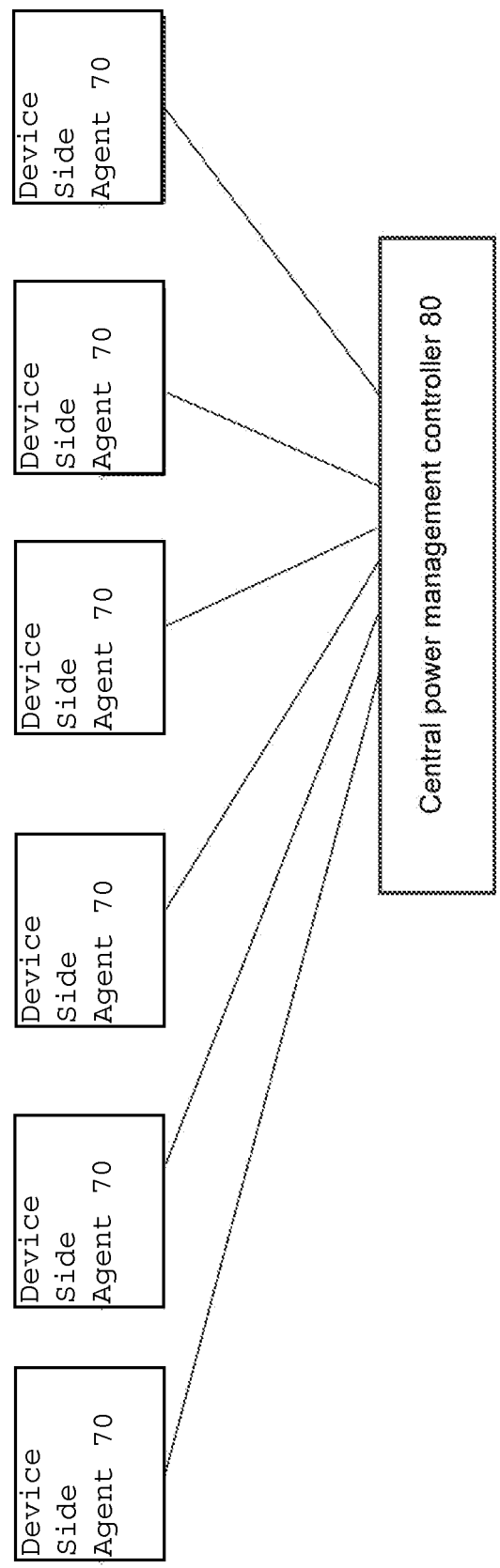
FIG. 6 is a block diagram of a central power management system according to an embodiment of the present invention.

FIG. 6 is a block diagram of a central power management system according to an embodiment of the present invention. As shown in FIG. 6, the central power management system 60 of the present embodiment comprises a plurality of device side agent 70 and central power management controller 80.

Each device side agent 70 is associated with a device in the data center/application system, is located inside the device or is connected to the device, for collecting status data from the device and reporting the status data to the central power management controller 80, as well as controlling the running status of the device according to a current power management policy determined for the device by the central power management controller 80.

Figure 7:
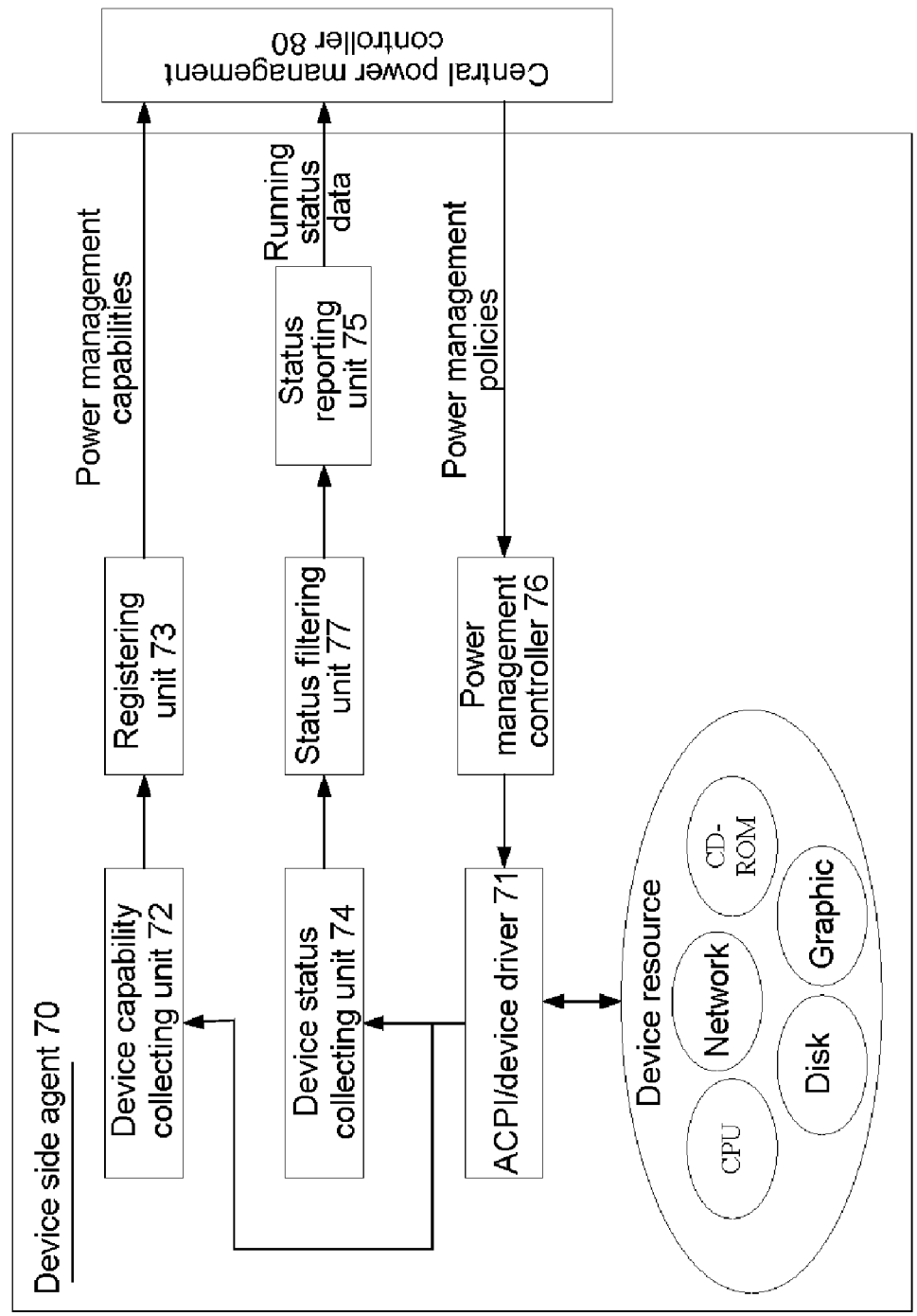
FIG. 7 is a block diagram of a device side agent according to an embodiment of the present invention.

The device side agent 70 will be described in detail below in conjunction with a drawing. FIG. 7 is a block diagram of the device side agent according to an embodiment of the present invention. As shown in FIG. 7, the device side agent 70 of the present embodiment comprises ACPI/device driver 71, device capability collecting unit 72, registering unit 73, device status collecting unit 74, status reporting unit 75 and power management controller 76.

The ACPI/device driver 71 is a low level driver for communicating with components in the related device according to instructions from the device capability collecting unit 72 and the device status collecting unit 74, so as to obtain the power management capabilities associated with controllable statuses of power management, running status of the device, etc., as well as making the components in the device switch statuses according to instruction of the power management controller 76.

The device capability collecting unit 72 is configured to collect the power management capabilities associated with controllable statuses of power management of the related device via the ACPI/device driver 71.

The registering unit 73 is configured to register the device related to the device side agent 70 with the central power management controller 80, where in addition to the basic information of the device, at least the power management capabilities of the device collected by the device capability collecting unit 72 are registered in the central power management controller 80.

In an embodiment, the device capability collecting unit 72 and the registering unit 73 are implemented to collect the power management capabilities for the device related thereto and register with the central power management controller 80 actively according to predetermined policies or change of environment status. In another embodiment, the device capability collecting unit 72 and the registering unit 73 are implemented to collect the power management capabilities for the device related thereto and register with the central power management controller 80 according to instruction of the central power management controller 80.

The device status collecting unit 74 is configured to periodically collect running status data of components from the related device via the ACPI/device driver 71.

The status reporting unit 75 is configured to report the running status data collected from the related device by the device status collecting unit 74 to the central power management controller 80. It may collect the running status data for the related device and report to the central power management controller 80 actively according to predetermined policies or change of environment status; and may also collect the running status data for the related device and report to the central power management controller 80 according to query instruction from the central power management controller 80.

The power management controller 76 is configured to control the running status of the related device via the ACPI/device driver 71 according to current power management policy determined by the central power management controller 80 for the device as well as the power management capabilities of the device.

The device side agent 70 of the present embodiment may further comprises status filtering unit 77 for filtering the running status data collected by the device status collecting unit 74 so as to remove the data associated with unstable status therein.

Returning to FIG. 6, the central power management controller 80 is configured to centrally receive from the plurality of device side agents 70 the running status data of the devices respectively related to the plurality of device side agents 70, to determine suitable power management policy for each of the devices, and control the running statuses of the devices via the plurality of device side agents 70 respectively.

Figure 8:
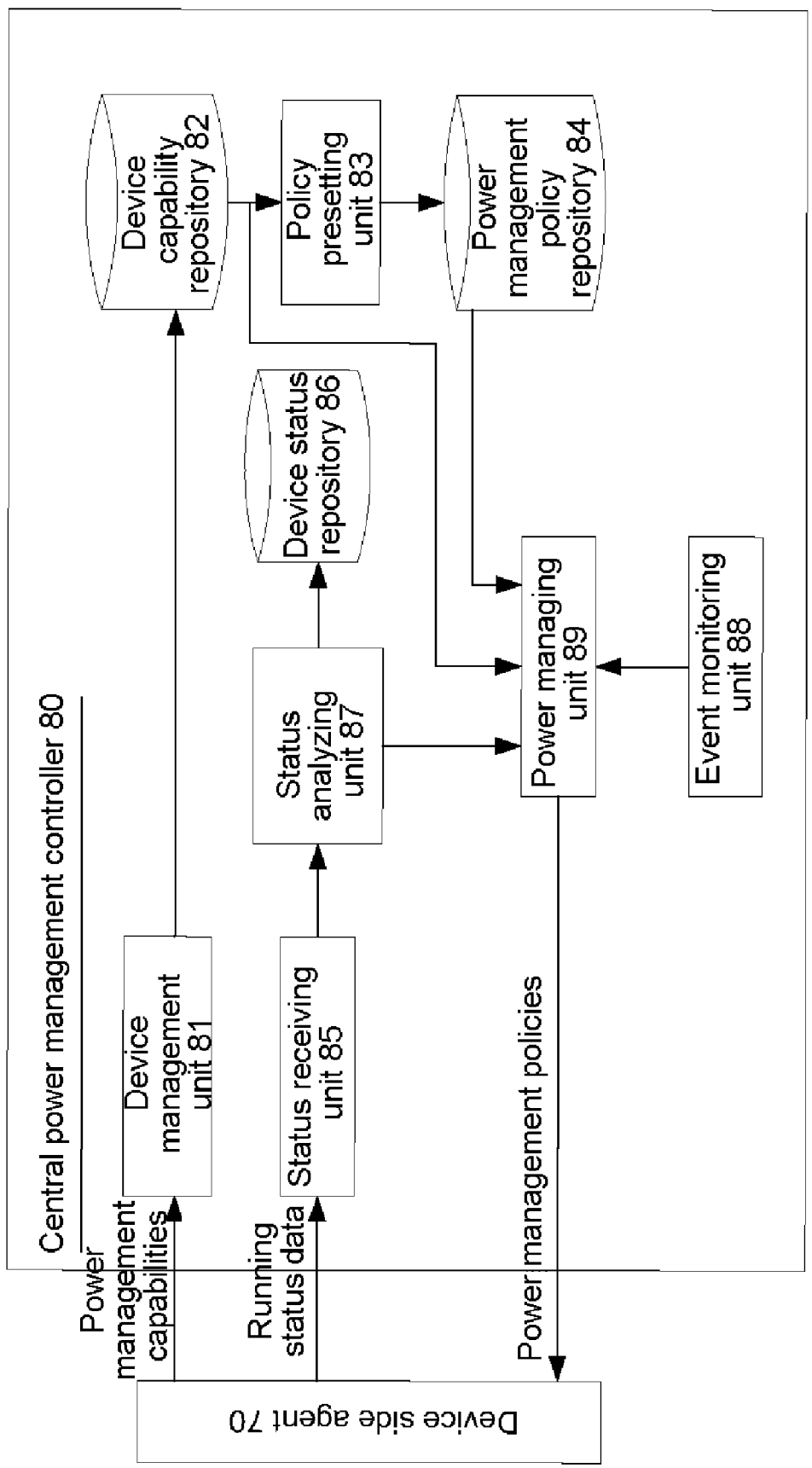
FIG. 8 is a block diagram of a central power management controller according to a first embodiment of the present invention.
Figure 9:
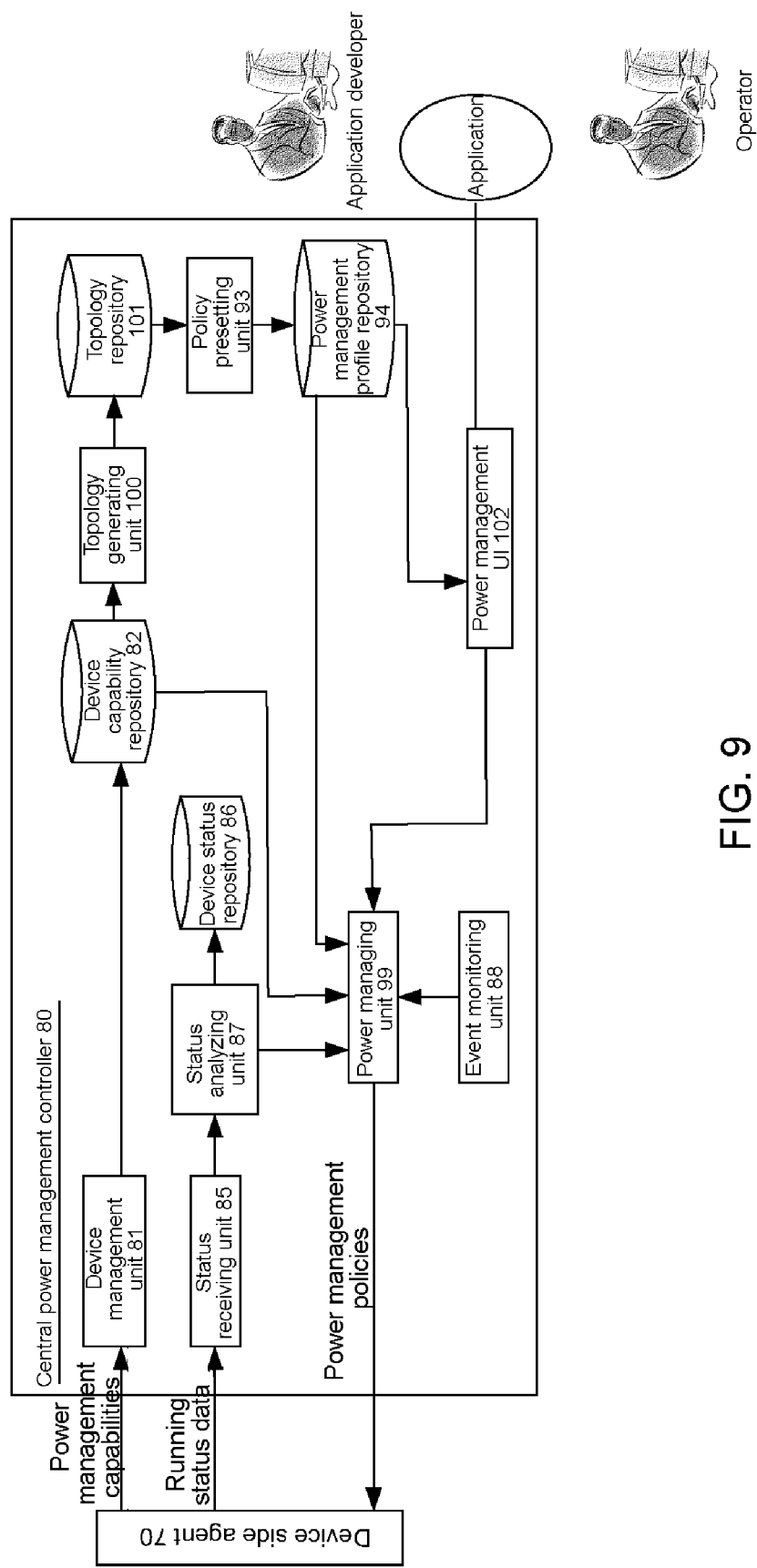
FIG. 9 is a block diagram of a central power management controller according to a second embodiment of the present invention.

The central power management controller 80 will be described in detail below in conjunction with drawings. FIG. 8 is a block diagram of the central power management controller according to the first embodiment of the present invention. FIG. 9 is a block diagram of the central power management controller according to a second embodiment of the present invention.

As shown in FIG. 8, a central power management controller 80 according to the first embodiment of the present invention comprises device management unit 81, device capability repository 82, policy presetting unit 83, power management policy repository 84, status receiving unit 85, device status repository 86, status analyzing unit 87, event monitoring unit 88, and power managing unit 89.

The device management unit 81 is configured to accept the registration performed by each of the plurality of device side agents 70 for its related device, wherein at least the power management capabilities associated with controllable statuses of power management of the device are recorded in the device capability repository 82.

In an embodiment, the device management unit 81 is implemented to initiate one or more of the plurality of device side agents 70 to register for their related devices by using an auto-discovery mechanism.

The policy presetting unit 83 is configured to enable a user to preset a plurality of power management policies and/or a policy tuning algorithm for each of the plurality of devices based on the power management capabilities of each of the plurality of devices stored in the device capability repository 82.

The power management policy repository 84 is configured to store the plurality of power management policies and/or the policy tuning algorithm for each of the plurality of devices.

The status receiving unit 85 is configured to receive the running status data collected by each of the plurality of device side agents 70 from its related device and store them in the device status repository 86.

In an embodiment, the status receiving unit 85 is implemented to query, with each of the plurality of device side agents 70, the running status data of its related device according to predetermined policies or change of environment status.

The status analyzing unit 87 is configured to analyze the running status data received by the status receiving unit 85 from the plurality of device side agents 70 to determine the current running status of the related device of each of the plurality of device side agents 70.

The event monitoring unit 88 is configured to monitor prescribed environment events such as a temperature change event when the current temperature reaches a predefined threshold and/or a time change event when the current time reaches a predefined threshold, and when such an environment event is detected, inform the power managing unit 89 of the event.

The power managing unit 89 is configured to, based on the result of analysis on the running status data by the status analyzing unit 87 or the prescribed environment event monitored by the event monitoring unit 88, for each of the plurality of devices, select a suitable power management policy from the plurality of power management policies stored in advance for the device in the power management policy repository 84, or tune the original power management policy of the device by using the policy tuning algorithm as the current power management policy of the device, and inform corresponding device side agent 70 of the current power management policy.

As shown in FIG. 9, the central power management controller 80 according to the second embodiment of present invention comprises device management unit 81, device capability repository 82, policy presetting unit 93, power management profile repository 94, status receiving unit 85, device status repository 86, status analyzing unit 87, event monitoring unit 88, power managing unit 99, topology generating unit 100, topology repository 101 and power management UI 102.

Therein, the device management unit 81, device capability repository 82, status receiving unit 85, device status repository 86, status analyzing unit 87 and event monitoring unit 88 are identical to the device management unit 81, device capability repository 82, status receiving unit 85, device status repository 86, status analyzing unit 87 and event monitoring unit 88 in FIG. 8 respectively, therefore the repetitive descriptions for these units will be omitted here.

In addition, the topology generating unit 100 in the present embodiment is configured to enable a user to define a topology for the plurality of devices registered by the plurality of device side agents 70 so as to manage the devices according to at least one of the function, location, application, power consumption, manageability, influence on environment, influence on performance and organization structure of the devices.

The topology repository 101 is configured to store the topology.

The policy presetting unit 93 is configured to enable a user to generate for the topology a plurality of power management profiles containing power management policies for each element therein based on the power management capabilities of each of the devices.

The power management profile repository 94 is configured to store the plurality of power management profiles of each of the plurality of devices.

The power managing unit 99 is configured to, based on the result of analysis on the running status data collected by the plurality of device side agents 70 from their related devices by the status analyzing unit 87 or prescribed environment event monitored by the event monitoring unit 88, for each element in the topology, select a suitable power management profile from the plurality of power management profiles stored for the element in the power management profile repository 94 or tuning the original power management profile of the element as its current power management policy, and inform corresponding device side agent 70 of the current power management policy.

The power management UI 102 is configured to enable a user for example an operator of data center/application system or an application developer to check or change the power management profile of each element in the topology.

The power management UI 102 may provide the user with APIs through which the power management profile of each element in the topology can be checked, changed or switched.

The above is a detailed description of the central power management system of the present embodiment. Therein, the device side agent 70 and the components thereof as well as the central power management controller 80 and the components thereof can be implemented with specifically designed circuits or chips or be implemented by a computer (processor) executing corresponding programs.

While the central power management method and system, device side agent and central power management controller of the present invention have been described in detail with some exemplary embodiments, these embodiments are not exhaustive, and those skilled in the art may make various variations and modifications within the spirit and scope of the present invention. Therefore, the present invention is not limited to these embodiments, the scope of which is only defined by appended claims.

The invention claimed is:

1. A central power management method, comprising:
registering a plurality of devices, wherein at least power management capabilities associated with controllable statuses of power management of each of the plurality of devices are recorded;
collecting running status data from each of the plurality of devices;
analyzing the running status data to determine a current power management policy for each of the plurality of devices;
for each of the plurality of devices, controlling running status thereof according to the current power management policy determined for the device and the power management capabilities of the device; and
defining a topology to manage the plurality of devices;
wherein the topology is a hierarchy structure comprising an atomic component level, a device level, a device group level, and a data center/application system level.

2. The method according to claim 1,
wherein the topology is further defined according to at least one of a function, location, application, power consumption, manageability, influence on environment, influence on performance and organization structure of the plurality of devices.

3. The method according to claim 1, wherein the step of collecting running status data from each of the plurality of devices further comprises:
collecting the running status data periodically from each of the plurality of devices by using an Advanced Configuration and Power Interface (ACPI)/device driver.

4. The method according to claim 1, wherein the registering the plurality of devices further comprises:
each of the plurality of devices actively registering itself according to predetermined policies or change of environment status, or triggering each of the plurality of devices to register itself by using an auto-discovery mechanism; and
wherein the collecting running status data from each of the plurality of devices further comprises:
each of the plurality of devices actively collecting and reporting its running status data according to predetermined policies or change of environment status, or querying from each of the plurality of devices its running status data according to predetermined policy or change of environment status.

5. The method according to claim 1, further comprising:
presetting at least one of a plurality of power management policies or a policy tuning algorithm for each of the plurality of devices based on the power management capabilities of the device.

6. The method according to claim 5, wherein the presetting at least one of a plurality of power management policies or a policy tuning algorithm for each of the plurality of devices further comprises:
mining history status data for each of the plurality of devices;
analyzing the history status data to summarize the practice of power management policy design for each of the plurality of devices; and
presetting a plurality of power management policies and/or a policy tuning algorithm for each of the plurality of devices based on the practice of power management policy design summarized for the device.

7. The method according to claim 5, wherein the analyzing the running status data to determine a current power management policy for each of the plurality of devices further comprises:
analyzing the running status data to determine the current running status of each of the plurality of devices; and
for each of the plurality of devices, based on its current running status, either selecting a suitable power management policy from the plurality of power management policies preset for it as its current power management policy, or tuning its original power management policy by using the policy tuning algorithm preset for it.

8. The method according to claim 2, further comprising:
for the topology, generating a plurality of power management profiles containing power management policies for each element therein in advance, wherein the plurality of power management profiles of the elements at a lowest level in the topology are generated based on the power management capabilities of the plurality of devices, and the plurality of power management profiles of the elements at intermediate and highest levels are generated based on a combination of the power management profiles of the elements they contain.

9. The method according to claim 8, wherein the, generating, for the topology, a plurality of power management profiles containing power management policies for each element therein in advance further comprises:
mining history status data for each of the plurality of devices;
analyzing the history status data to summarize the practice of power management policy design for each element in the topology; and
generating a plurality of power management profiles containing power management policies for each element in the topology based on the practice of power management policy design summarized for the element.

10. The method according to claim 8, wherein the step of analyzing the running status data to determine a current power management policy for each of the plurality of devices further comprises:
analyzing the running status data to determine the current running status of each of the plurality of devices; and
based on the current running status of each of the plurality of devices, for each element in the topology, either selecting a suitable power management profile from the plurality of power management profiles generated for the element in advance as its current power management policy, or tuning its original power management profile containing power management policy.

11. The method according to claim 1, further comprising:
monitoring prescribed environment events; and
when a prescribed environment event is detected, based on the prescribed environment event, for each of the plurality of devices, determining a current power management policy.

12. The method according to claim 1, wherein the for each of the plurality of devices, controlling running status thereof according to the current power management policy determined for the device and the power management capabilities of the device further comprises:
controlling the current running status of the device by using an ACPI/device driver.

13. A central power management controller, comprising:
a device managing unit for accepting, for each of a plurality of devices, registration thereof performed by a device side agent related to the device, wherein at least power management capabilities associated with controllable statuses of power management of each of the plurality of devices are recorded;
a status analyzing unit for analyzing, for each of the plurality of devices, running status data collected from the device by its related device side agent;
a power managing unit for determining a current power management policy for each of the plurality of devices based on the result of analysis on the running status data by the status analyzing unit, and informing the device side agent related to the device of the current power management policy; and
a topology generating unit for defining a topology to manage the plurality of devices;
wherein the topology is a hierarchy structure comprising an atomic component level, a device level, a device group level, and a data center/application system level.

14. The central power management controller according to claim 13, further comprising:
a policy presetting unit for presetting at least one of a plurality of power management policies or a policy tuning algorithm for each of the plurality of devices based on the power management capabilities of each of the plurality of devices;
wherein, for each of the plurality of devices, based on the result of analysis on the running status data by the status analyzing unit, the power managing unit selects a suitable power management policy from the plurality of power management policies preset for the device or tuning original power management policy of the device by using the policy tuning algorithm preset for the device as the current power management policy.

15. The central power management controller according to claim 13, further comprising:
a policy presetting unit for generating a plurality of power management profiles containing power management policies for each element in the topology in advance;
wherein, for each element in the topology, based on the result of analysis on the running status data by the status analyzing unit, the power managing unit selects a suitable power management profile from the plurality of power management profiles generated for the element or tuning original power management profile of the element as the current power management policy.

16. The central power management controller according to claim 13, further comprising:
an event monitoring unit for monitoring prescribed environment events;
wherein when the event monitoring unit monitored a prescribed environment event, the power managing unit determines the current power management policy for each of the plurality of devices based on the prescribed environment event.

17. A central power management system, comprising:
a plurality of the device side agents, each comprising:
a registering unit for registering a device associated with the device side agent with a central power management controller, wherein at least power management capabilities associated with controllable statuses of power management of the device are registered with the central power management controller;
a status reporting unit for reporting running status data collected from the device to the central power management controller; and
a power management controller for controlling running status of the device according to a current power management policy determined for the device by the central power management controller and the power management capabilities of the device; and a central power management controller comprising:

a device managing unit for accepting, for each of a plurality of devices, registration thereof performed by a device side agent related to the device, wherein at least power management capabilities associated with controllable statuses of power management of each of the plurality of devices are recorded;

a status analyzing unit for analyzing, for each of the plurality of devices, running status data collected from the device by its related device side agent;

a power managing unit for determining a current power management policy for each of the plurality of devices based on the result of analysis on the running status data by the status analyzing unit, and informing the device side agent related to the device of the current power management policy; and a topology generating unit for defining a topology to manage the plurality of devices;

wherein the topology is a hierarchy structure comprising an atomic component level, a device level, a device group level, and a data center/application system level.

* * * * *